Nov. 23, 1926.

J. V. O. PALM 1,607,745

THERMOSTAT VALVE FOR FLUID CONTROL

Filed May 12, 1923

INVENTOR.

John V. O. Palm.

BY

Fay, Oberlin & Fay

ATTORNEYS

Patented Nov. 23, 1926.

1,607,745

UNITED STATES PATENT OFFICE.

JOHN V. O. PALM, OF CLEVELAND HEIGHTS, OHIO, ASSIGNOR TO THE BISHOP AND BABCOCK COMPANY, OF CLEVELAND, OHIO, A CORPORATION OF OHIO.

THERMOSTAT VALVE FOR FLUID CONTROL.

Application filed May 12, 1923. Serial No. 638,501.

The present invention relates to automatic valves for fluid temperature control. The present valves in the form shown are particularly adapted for automatically controlling the flow of the cooling fluid in the cooling system of an automobile or other internal combustion engine and are adapted to be placed in the pipe between the engine and the radiator and are suitable for use in all types of cooling systems whether the flow of cooling fluid is under pressure from a pump or is accomplished by the thermosiphon system. The present valve is of the same general type as the valve shown in my co-pending application filed March 5, 1923, Serial No. 623,004, but in the present construction the valve mechanism itself is simplified and is adapted for use with systems where there is no real fluid pressure, as well as for systems having a comparatively high fluid pressure. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1:
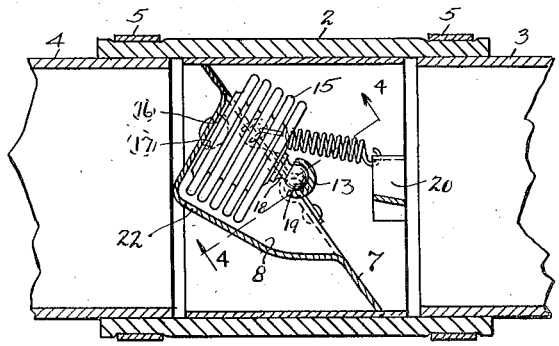
Figure 4:
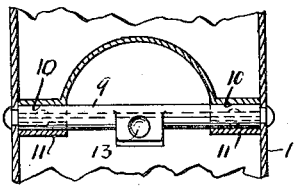
Figure 3:
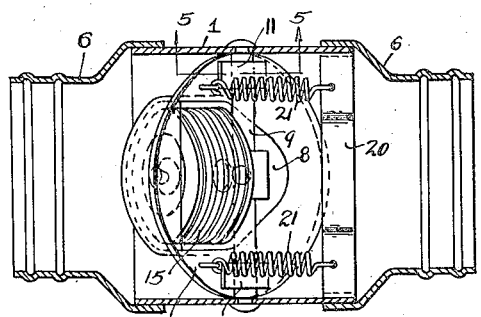
Figure 2:
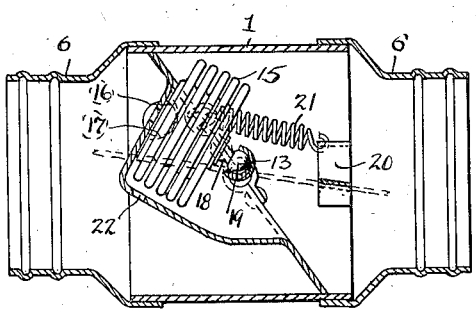
Figure 5:
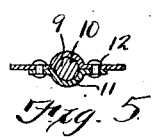

Fig. 1 is a vertical sectional view through the device; Fig. 2 is a similar vertical section, but showing the device mounted in a casing which may be used as a unit for insertion in the water line; Fig. 3 is a horizontal sectional view on the line 3—3 of Fig. 2; Fig. 4 is a section on the line 4—4 of Fig. 1, and Fig. 5 is a sectional view of a detail.

As illustrated in the drawings, the valve mechanism consists of a supporting frame or casing 1 which may be placed either inside of a hose line 2 and held in place between the two connected pipes 3 and 4 by clamps 5 or which may be provided with end caps 6 as shown in Figs. 2 and 3, and in this construction the extending ends of the caps are mounted in the hose line and it will be clamped in place in the usual manner.

The valve construction proper comprises a butterfly valve 7 normally set at an angle in the casing, but substantially closing the same and this valve is provided with an offset or depressed central portion 8 in which the operating mechanism is mounted. The valve is pivotally mounted about a cross-shaft 9 carried by the casing and the valve is mounted on the shaft by means of two small depressions 10 formed near the ends and covered by caps 11 which are secured by rivets 12 to form bearings for the valve. At its center the shaft is provided with an eccentric cup 13 formed integrally with the shaft or rigidly attached thereto.

The expansible member, preferably a metal bellows 15, is mounted between the valve 7 and the cup 13 and is anchored in the valve by means of a ball end 16 on the valve fitting into a complementary socket 17 in the end of the bellows. The other end of the bellows has an extending rod 18 with a cylindrical or spherical end 19 fitting the eccentric cup 13 on the shaft 9 which is secured in the casing against rotation.

The expansible member 15 is thus pivotally movable with the valve as the latter revolves about its axis, the shaft 9, but the axis about which the expansible member moves is the eccentric cup 13 which allows expansion of the member to rotate and open the valve. In small units the bellows may be rigidly secured to the valve but this distorts the bellows during expansion and the preferable form is to pivot both ends of the bellows while allowing the same to be carried by and bodily movable with the valve as it rotates from its closed position to its open position, shown in dotted lines in Figs. 1 and 2. To normally maintain the valve in its closed position, the casing is provided at the low pressure end with a cross-strap 20 and two coiled springs 21 are employed, which are connected to the valve above its axis and to this strap, thus normally placing the valve under a tension tending to maintain it in its closed position and to return it to this position whenever the pressure caused by the bellows is reduced.

This cross-strap 20 also acts as a stop for the valve and limits the valve opening to the position shown in dotted lines in Figs. 1 and 2.

The present valve is similar in its action to that disclosed in my co-pending application and the depressed portion of the valve is provided with a small aperture 22 allowing a normal leakage through the valve and the bellows will be so arranged as to open the valve as soon as the water reaches the desired predetermined temperature. This valve is adapted to be mounted in any fluid line where it is desirable to control the flow of fluid according to the temperature and when used in the cooling system of an automobile it will preferably be placed in the return line between the engine and the radiator and the bellows and operating mechanism will be mounted on the low pressure side of the valve, although in thermo-siphon systems it will make no difference on which side of the valve the operating mechanism is, as in this type of cooling systems there is substantially no pressure on the cooling fluid.

The present valve may be used here in the form shown in Fig. 1 and where used in this manner the outer casing is merely inserted within the connecting hose or this casing may be provided with the end caps which may be screw-threaded on to the casing or secured thereto in any other suitable manner and, where it is used with the caps, the projecting ends of the same are inserted in the hose and clamped in place therein by the usual hose clamps or the caps may be formed with either internal or external screw threads so that the valve may be directly connected in a pipe line or the like in place of the usual coupling.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a thermostatic valve for fluid control, the combination of a casing, a valve pivotally mounted therein about a transverse axis, an expansible bellows seated in said valve and pivotally movable therewith, said bellows having one end pivotally mounted about a point eccentric to the axis of said valve to allow expansion of said bellows to open said valve.

2. In a thermostatic valve for fluid control, the combination of a casing, a valve pivotally mounted therein about a transverse axis, resilient means normally holding said valve in its closed position, an expansible member seated in said valve and pivotally movable therewith, said member having one end pivotally mounted about a point eccentric to the axis of said valve to allow expansion of said member to actuate said valve against the action of said resilient means.

3. In a thermostatic valve for fluid control, the combination of a casing, a cross-shaft therein, an eccentric cup on said shaft, a valve pivotally mounted on said shaft, resilient means normally holding said valve in its inoperative position, and an expansible thermostatic member anchored to said valve and pivotally engaging said cup and adapted upon expansion to move said valve against the tension of said resilient means.

4. In a thermostatic valve for fluid control, the combination of a casing, a cross-shaft therein, an eccentric cup on said shaft, a valve pivotally mounted on said shaft, resilient means normally holding said valve in its inoperative position, and an expansible thermostatic member attached to said valve and pivotally engaging said cup and adapted upon expansion to move said valve against the tension of said resilient means, and stop means limiting the movement of said valve.

5. In a thermostatic valve for fluid control, the combination of a casing, a cross-shaft therein, an eccentric cup on said shaft, a butterfly valve pivotally mounted on said shaft, resilient means normally holding said valve in its inoperative position and an expansible thermostatic member attached to said valve, said member having an extending rod with a ball end pivotally mounted in said cup, and adapted upon expansion to pivot about said cup to operate said valve.

6. In a thermostatic valve for cooling systems, the combination of a casing, a cross-shaft therein, an eccentric cup on said shaft, a butterfly valve pivotally mounted on said shaft, resilient means normally holding said valve in its inoperative position, and an expansible thermostatic member pivotally mounted in said valve, said member having an extending rod with a ball end pivotally mounted in said cup, and adapted upon expansion to pivot about said cup to actuate said valve, the frictional thrust components of said valve on said shaft caused by said expansible member and said resilient means being counter-acted by each other.

7. In a thermostatic control valve, the combination of a casing, a valve pivotally mounted in said casing and having a depressed portion, a fixed element in said casing, an expansible member having one end secured to the bottom of such depressed portion and having a pivotal bearing on said fixed element and adapted upon expansion to open said valve and to pivot therewith.

8. In a thermostatic control valve, the combination of a casing, a valve pivotally mounted in said casing and having a depressed portion, a fixed element in said casing, an expansible bellows fixedly secured at one end to the bottom of such depressed portion and having a pivotal bearing on said fixed element and adapted upon expansion to open said valve and to pivotally move therewith.

Signed by me this 10th day of May, 1923.

JOHN V. O. PALM.